(12) United States Patent
Ogata et al.

(10) Patent No.: US 9,299,982 B2
(45) Date of Patent: Mar. 29, 2016

(54) POSITIVE ELECTRODE ACTIVE MATERIAL FOR NONAQUEOUS ELECTROLYTE SECONDARY BATTERY, METHOD FOR PRODUCING THE SAME, POSITIVE ELECTRODE FOR NONAQUEOUS ELECTOLYTE

(75) Inventors: Atsushi Ogata, Kobe (JP); Takeshi Ogasawara, Kobe (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 367 days.

(21) Appl. No.: 13/982,428

(22) PCT Filed: Dec. 27, 2011

(86) PCT No.: PCT/JP2011/080285
§ 371 (c)(1),
(2), (4) Date: Jul. 29, 2013

(87) PCT Pub. No.: WO2012/101948
PCT Pub. Date: Aug. 2, 2012

(65) Prior Publication Data
US 2013/0309567 A1    Nov. 21, 2013

(30) Foreign Application Priority Data
Jan. 28, 2011 (JP) ................. 2011-016570

(51) Int. Cl.
*H01M 4/1315* (2010.01)
*H01M 4/36* (2006.01)
*H01M 4/525* (2010.01)
*H01M 10/052* (2010.01)
*H01M 4/02* (2006.01)

(52) U.S. Cl.
CPC ............. *H01M 4/366* (2013.01); *H01M 4/525* (2013.01); *H01M 10/052* (2013.01); *H01M 2004/021* (2013.01); *Y02E 60/122* (2013.01); *Y02P 70/54* (2015.11); *Y02T 10/7011* (2013.01)

(58) Field of Classification Search
None
See application file for complete search history.

(56) References Cited

U.S. PATENT DOCUMENTS

2006/0003226 A1*  1/2006  Sawa ................. H01M 4/0471
                                                     429/218.1
2009/0087362 A1    4/2009  Sun et al.

FOREIGN PATENT DOCUMENTS

JP    2000-353524 A    12/2000
JP    2008-536285 A     9/2008
(Continued)

OTHER PUBLICATIONS

En translation of JP2010-086922—2010.*
(Continued)

*Primary Examiner* — Patrick Ryan
*Assistant Examiner* — Lucas J. O'Donnell
(74) *Attorney, Agent, or Firm* — Westerman, Hattori, Daniels & Adrian, LLP (57) ABSTRACT

An object of the present invention is to provide a positive electrode active material for a nonaqueous electrolyte secondary battery etc. which are capable of suppressing the generation of gas during charge by suppressing a reaction between a positive electrode and an electrolyte decomposition product moved from a negative electrode and a reaction between the positive electrode and the electrolyte, and which are thereby capable of significantly improving battery characteristics such as cycling characteristics. The positive electrode active material includes a compound composed of sodium, fluorine, and erbium and adhered to a surface of lithium cobalt oxide, and can be produced by adding, while adjusting pH, an aqueous solution prepared by dissolving erbium nitrate pentahydrate to a suspension containing lithium cobalt oxide and sodium fluoride.

20 Claims, 3 Drawing Sheets

(56) References Cited

FOREIGN PATENT DOCUMENTS

| | | |
|---|---|---|
| JP | 2008-234988 A | 10/2008 |
| JP | 2010-086922 A | 4/2010 |

OTHER PUBLICATIONS

International Search Report dated Apr. 17, 2012, issued in corresponding application No. PCT/JP2011/080285.

* cited by examiner

POSITIVE ELECTRODE ACTIVE MATERIAL FOR NONAQUEOUS ELECTROLYTE SECONDARY BATTERY, METHOD FOR PRODUCING THE SAME, POSITIVE ELECTRODE FOR NONAQUEOUS ELECTOLYTE

TECHNICAL FIELD

The present invention relates to a positive electrode active material for a nonaqueous electrolyte secondary battery, etc.

BACKGROUND ART

In recent years, reductions in size and weight of mobile information terminals such as a cellular phone, a notebook-size personal computer, PDA, and the like have been rapidly advanced, and batteries used as driving power supplies have been required to have higher capacity. Lithium ion batteries which are charged and discharged by movement of lithium ions between positive and negative electrodes in association with charge and discharge have a high energy density and high capacity, and are thus widely used as driving power supplies for the above-described mobile information terminals.

The mobile information terminals are liable to be further increased in power consumption with enhancement of functions such as a video replay function and a game function, and are strongly demanded to have higher capacity. A method for increasing the capacity of the nonaqueous electrolyte batteries is, for example, a method of increasing the capacity of an active material, a method of increasing the amount of an active material filling per unit volume, or a method of increasing the charge voltage of a battery. However, an increase in charge voltage of a battery increases reactivity between a positive electrode active material and a nonaqueous electrolyte and degrades materials involved in charge and discharge of a battery, thereby not a little adversely affecting battery performance.

In order to solve the above problems, proposals described below have been made.

(1) A positive electrode active material is coated with a fluoride such as aluminum fluoride, zinc fluoride, lithium fluoride, or the like in an amount of 0.1 to 10% by weight in terms of metal atom relative to the weight of the positive electrode active material. It is described that cycling characteristics are improved as a result (refer to Patent Literature 1 below).

(2) A method for producing a positive electrode including mixing a fluoride at a ratio of 0.3 to 10% by weight relative to the weight of a positive electrode active material is described, in which a composite oxide as a raw material containing lithium, a transition metal, and oxygen is mixed with a fluoride of a rare earth element having an average particle diameter of 20 μm or less, and the resultant mixture is further ground and mixed (refer to Patent Literature 2 below).

CITATION LIST

Patent Literature

PTL 1: Japanese Published Unexamined Patent (Transition of PCT Application) No. 2008-536285

PTL 2: Japanese Published Unexamined Patent Application No. 2000-353524

SUMMARY OF INVENTION

Technical Problem

However, the above-mentioned two proposals cannot satisfactorily suppress reaction between an electrolyte and a positive electrode active material and reaction between a decomposition product produced by reaction on a negative electrode and moved to a positive electrode and the positive electrode active material, and thus have the problem of failing to significantly improve cycling characteristics.

Solution to Problem

The present invention includes a lithium transition metal composite oxide and a compound composed of an alkali metal element, a fluorine element, and a rare earth element, the compound being mainly present on a surface of the lithium transition metal composite oxide.

Advantageous Effects of Invention

The present invention exhibits the excellent effect of being capable of significantly improving battery characteristics such as cycling characteristics and the like.

DESCRIPTION OF EMBODIMENTS

The present invention includes a lithium transition metal composite oxide and a compound composed of an alkali metal element, a fluorine element, and a rare earth element, the compound being mainly present on a surface of the lithium transition metal composite oxide.

When the compound composed of an alkali metal element, a fluorine element, and a rare earth element is mainly present on a surface of the lithium transition metal composite oxide, the lithium transition metal composite oxide can be satisfactorily suppressed from reacting with an electrolyte and a decomposition product produced by reaction with a negative electrode active material can be satisfactorily suppressed from being moved to a positive electrode and reacting with the lithium transition metal composite oxide. Therefore, the cycling characteristics of a battery using the positive electrode active material can be significantly improved.

Also, since the compound composed of an alkali metal element, a fluorine element, and a rare earth element is mainly present on a surface of the lithium transition metal composite oxide, side reaction on the lithium transition metal composite oxide is effectively suppressed. However, the expression "is mainly present" represents that the compound need not be entirely present on a surface of the lithium transition metal composite oxide and may be partially present inside the lithium transition metal composite oxide. When the compound is present on a surface of the lithium transition metal composite oxide, the compound may be present on not only surfaces of primary particles of the lithium transition metal composite oxide but also surfaces of secondary particles of the lithium transition metal composite oxide. In particular, the surfaces of secondary particles are more active than the surfaces of primary particles, and thus when the compound is present on the surfaces of secondary particles, side reaction between the lithium transition metal composite oxide and the electrolyte or the like can be further suppressed.

The term "mainly" represents a state in which 50% by mass or more of the compound is present on a surface of the lithium transition metal composite oxide.

Examples of a typical composition formula of the compound composed of an alkali metal element, a fluorine element, and a rare earth element include $ALn_3F_{10}$, $ALn_2F_7$, $A_3Ln_5F_{18}$, $ALnF_4$, $A_3Ln_2F_9$, $A_2LnF_5$, $A_3LnF_6$, $A_XLnF_{3+X}$ (0<X, A=alkali metal element, Ln=rare earth element), and the like.

The compound composed of an alkali metal element, a fluorine element, and a rare earth element is preferably adhered to a surface of the lithium transition metal composite oxide.

When the compound composed of an alkali metal element, a fluorine element, and a rare earth element is present on a surface of the lithium transition metal composite oxide and adhered to the surface, the above-described operation and function can be easily exhibited over a long period of time. This is because in the positive electrode active material configured as described above, the compound composed of an alkali metal element, a fluorine element, and a rare earth element is little separated from the lithium transition metal composite oxide when kneaded with a conductive agent and the like, and the compound is easily maintained in a uniformly dispersed state.

The compound composed of an alkali metal element, a fluorine element, and a rare earth element preferably has an average particle diameter of 1 nm or more and 100 nm or less.

When the compound has an average particle diameter exceeding 100 nm, an area of adhering to the lithium transition metal composite oxide is not so increased even by increasing the volume of a compound. Therefore, with the same amount of adhering, the effect of suppressing the side reaction such as decomposition of the electrolyte is less exhibited as the average particle diameter of the compound increases. In order to prevent this, it is necessary to excessively add the compound, but the excessive addition of the compound causes a decrease in charge-discharge characteristics of a battery due to difficulty in electron transfer between positive electrode active materials, between the positive electrode active material and a conductive agent, between the positive electrode active material and a current collector, or the like.

However, when the compound has an average particle diameter of 100 nm or less, inhibition to lithium movement can be suppressed. In addition, since the side reaction such as decomposition of the electrolyte can be suppressed without excessively adding the compound, the reaction between the electrolyte and the lithium transition metal composite oxide can be more effectively suppressed without causing a decrease in output performance of a battery. On the other hand, the average particle diameter of the compound is regulated to 1 nm or more for the reason that when the average particle diameter is less than 1 nm, a surface of the lithium transition metal composite oxide is excessively covered with the compound, thereby causing difficulty in electron transfer between positive electrode active materials, between the positive electrode active material and a conductive agent, between the positive electrode active material and a current collector, or the like, resulting in the possibility of decreasing charge-discharge characteristics of a battery.

The average particle diameter is a value determined by observation with a scanning electron microscope (SEM).

The present invention includes a positive-electrode current collector and a positive-electrode mixture layer formed on at least one of the surfaces of the positive-electrode current collector, the positive-electrode mixture layer containing a positive electrode active material containing a lithium transition metal composite oxide, a binder, a conductive agent, and a compound composed of an alkali metal element, a fluorine element, and a rare earth element.

The compound composed of an alkali metal element, a fluorine element, and a rare earth element may be contained in the positive-electrode mixture layer (that is, need not be necessarily present on a surface of the lithium transition metal composite oxide or the like). Therefore, the present invention includes a case where the compound is simply mixed with the lithium transition metal composite oxide.

The compound composed of an alkali metal element, a fluorine element, and a rare earth element is preferably mainly present on a surface of the lithium transition metal composite oxide, and the compound is particularly preferably adhered to a surface of the lithium transition metal composite oxide. The compound preferably has an average particle diameter of 1 nm or more and 100 nm or less.

With such a configuration, as described above, the operation and effect of the present invention can be further exhibited.

The present invention includes adding, while adjusting pH, an aqueous solution prepared by dissolving a compound containing a rare earth element to a suspension containing a lithium transition metal composite oxide and a water-soluble compound containing fluorine and an alkali metal.

According to this method, the compound composed of an alkali metal element, a fluorine element, and a rare earth element can be previously disposed (adhered by the method) on a surface of the lithium transition metal composite oxide. In particular, by using the method, the compound can be not only adhered to a surface of the lithium transition metal composite oxide but also uniformly dispersed and adhered to a surface of the lithium transition metal composite oxide, and thus battery characteristics such as the cycling characteristics can be further improved. However, a method for disposing the compound on a surface of the lithium transition metal composite oxide is not limited to this method and, for example, may be a method of mechanically mixing the lithium transition metal composite oxide with the compound composed of an alkali metal element, a fluorine element, and a rare earth element, or a method of spraying, on the lithium transition metal composite oxide, a solution prepared by dissolving a rare earth salt and a salt containing fluorine and alkali metal or a solution prepared by dissolving a rare earth salt, a salt containing alkali metal, and a salt containing fluorine, followed by drying and further heat treatment.

When the above-described method is used, the pH of the suspension is preferably 4 or more and 12 or less. This is because with a pH of less than 4, the lithium transition metal composite oxide may be dissolved. On the other hand, with a pH exceeding 12, impurities such as a rare earth hydroxide and the like may be produced by adding an aqueous solution prepared by dissolving a compound containing a rare earth element. The pH can be adjusted with an acidic or basic aqueous solution.

Examples of the compound containing an alkali metal element and fluorine include lithium fluoride, sodium fluoride, potassium fluoride, and the like. The amount of the compound added is preferably more than 3 moles and 10 moles or less per mole of a rare earth salt according to possible valence (that is, an amount of reaction) of a rare earth. This is because when the amount of the compound containing an alkali metal and fluoride added is equal to or smaller than the number of moles corresponding to the possible valence of the rare earth, the compound containing an alkali metal, fluorine element, and a rare earth element may not be sufficiently produced due to an insufficient amount of fluorine, while when the amount of the compound added exceeds 10 moles, the amount of the compound added is excessively large and thus produces waste.

Examples of the compound (rare earth salt) containing a rare earth element include a sulfate, a nitrate, a chloride, an acetate, an oxalate, and the like.

The ratio of the compound composed of an alkali metal element, a fluorine element, and a rare earth element to the lithium transition metal composite oxide is preferably 0.01% by mass or more and 0.3% by mass or less in terms of rare earth element. At the ratio of less than 0.01% by mass, the amount of the compound adhering to the surface of the lithium transition metal composite oxide is excessively small, thereby failing to achieve a satisfactory effect. On the other hand, at the ratio exceeding 0.3% by mass, the charge-discharge characteristics of a battery are degraded due to difficulty in electron transfer between positive electrode active materials, between the positive electrode active material and a conductive agent, between the positive electrode active material and a current collector, or the like.

After the compound composed of an alkali metal element, a fluorine element, and a rare earth element is adhered to a surface of the lithium transition metal composite oxide, heat treatment is preferably performed at less than 500° C.

After the positive electrode active material is prepared as described above, the positive electrode active material may be heat-treated in an oxidizing atmosphere, a reducing atmosphere, or a reduced-pressure state. In the heat treatment, a heat treatment temperature exceeding 500° C. causes not only decomposition and aggregation of the compound adhered to the surface of the lithium transition metal composite oxide but also diffusion of the compound into the lithium transition metal composite oxide with an increase in temperature. This may decrease the effect of suppressing the reaction between the electrolyte and the positive electrode active material. Therefore, the heat treatment is preferably performed at a treatment temperature of less than 500° C. However, the heat treatment temperature is preferably 80° C. or more in order to appropriately remove moisture.

A nonaqueous electrolyte secondary battery includes the above-described positive electrode, a negative electrode, and a nonaqueous electrolyte.

A negative electrode active material contained in the negative electrode preferably contains at least one selected from the group consisting of carbon particles, silicon particles, and silicon alloy particles.

The charge-discharge potential of carbon particles is low and close to the oxidation-reduction potential of metallic lithium, and thus side reaction between carbon and the electrolyte on the surfaces of carbon particles easily occurs during initial charge and discharge.

On the other hand, silicon particles and silicon alloy particles have higher charge-discharge potentials than that of carbon, but the negative electrode active material is cracked due to a change in volume during charge-discharge cycles because of a high degree of expansion and contraction with charge and discharge, thereby producing newly formed surfaces electrochemically active (easily producing reaction with the electrolyte). As a result, side reaction between the electrolyte and silicon particles or the like significantly occurs on the newly formed surfaces during charge-discharge cycles.

Therefore, in the use of any particles, a decomposition product is produced by side reaction between the electrolyte and the negative electrode active material, and the decomposition product is repeatedly moved to the positive electrode. This causes reaction between the decomposition product and the lithium transition metal composite oxide on the surface of the positive electrode, thereby accelerating deterioration in the positive electrode. However, when the compound composed of an alkali metal element, a fluorine element, and a rare earth element is adhered to the surface of the lithium transition metal composite oxide, the occurrence of such a reaction can be suppressed.

(Other Matters)

(1) The positive electrode active material used in the present invention is, for example, a lithium transition metal composite oxide containing transition metals such as cobalt, nickel, manganese, and the like. Specific examples thereof include lithium cobalt oxide, lithium Ni—Co—Mn oxide, lithium Ni—Mn—Al oxide, lithium Ni—Co—Al oxide, lithium Co—Mn oxide, and transition metal oxo acid salts containing iron, manganese, or the like (represented by $LiMPO_4$, $Li_2MSiO_4$, or $LiMBO_3$ wherein M is selected from Fe, Mn, Co, and Ni). These may be used alone or as a mixture.

(2) The lithium transition metal composite oxide may contain a substance of Al, Mg, Ti, Zr, or the like dissolved as solid solution or located at grain boundaries. Besides the compound composed of an alkali metal element, a fluorine element, and a rare earth element, a compound of Al, Mg, Ti, Zr, or the like may be adhered to the surface of the lithium transition metal composite oxide. This is because even when such a compound is adhered, contact between the electrolyte and the positive electrode active material can be suppressed.

(3) The lithium nickel—cobalt—manganese oxide having a known composition having a molar ratio of nickel, cobalt, and manganese of 1:1:1, 5:3:2, 5:2:3, 6:2:2, 7:2:1, 7:1:2, 8:1:1, or the like can be used. In order to increase the positive electrode capacity, the ratios of nickel and cobalt are particularly preferably higher than that of manganese.

(4) A solvent of a nonaqueous electrolyte used in the present invention is not limited, and a solvent generally used for nonaqueous electrolyte secondary batteries can be used. Examples thereof include cyclic carbonates such as ethylene carbonate, propylene carbonate, butylene carbonate, vinylene carbonate, and the like; linear carbonates such as dimethyl carbonate, methylethyl carbonate, diethyl carbonate, and the like; ester-containing compounds such as methyl acetate, ethyl acetate, propyl acetate, methyl propionate, ethyl propionate, γ-butyrolactone, and the like; sulfone group-containing compounds such as propanesultone and the like; ether-containing compounds such as 1,2-dimethoxyethane, 1,2-diethoxyethane, tetrahydrofuran, 1,2-dioxane, 1,4-dioxane, 2-methyltetrahydrofuran, and the like; nitrile-containing compounds such as butyronitrile, valeronitrile, n-heptanenitrile, succinonitrile, glutaronitrile, adiponitrile, pimelonitrile, 1,2,3-propanetricarbonitrile, 1,3,5-pentanetricarbonitrile, and the like; amide-containing compounds such as dimethylformamide and the like. In particular, these solvents each partially substituted by F for H can be preferably used. These solvents can be used alone or in combination of two or more, and in particular, a solvent containing a combination of a cyclic carbonate and a linear carbonate, and a solvent further containing a small amount of nitrile-containing compound or ether-containing compound in combination with a cyclic carbonate and a linear carbonate are preferred.

On the other hand, a solute which has been used can be used as a solute of a nonaqueous electrolyte, and examples thereof include $LiPF_6$, $LiBF_4$, $LiN(SO_2CF_3)_2$, $LiN(SO_2C_2F_5)_2$, $LiPF_{6-x}(C_nF_{2n-1})_x$ (wherein 1<x<6, N=1 or 2), and the like. These may be used alone or as a mixture of two or more. The concentration of the solute is not particularly limited but is preferably 0.8 to 1.8 mol per liter of the electrolyte.

(5) A negative electrode which has been used can be used as the negative electrode in the present invention. In particular, a lithium-absorbable and desorbable carbon material, a metal capable of forming an alloy with lithium, or an alloy compound containing the metal can be used.

Examples of the carbon material which can be used include graphites such as natural graphite, non-graphitizable carbon, artificial graphite, and the like; cokes, and the like. An alloy compound containing at least one metal capable of forming an alloy with lithium can be used. In particular, silicon and tin are preferred as an element capable of forming an alloy with lithium, and silicon oxide, tin oxide, and the like, which contain oxygen bonded to the elements, can also be used. Also, a mixture of the carbon material and a silicon or tin compound can be used.

Besides the above-described materials, a material having a lower energy density but a higher charge-discharge potential versus metallic lithium, such as lithium titanate, than that of carbon materials can be used as a negative electrode material.

(6) A layer composed of an inorganic filler, which has been used, can be formed at an interface between the positive electrode and a separator or an interface between the negative electrode and a separator. As the filler, titanium, aluminum, silicon, magnesium, and the like, which have been used, can be used alone, used as an oxide or phosphoric acid compound containing two or more of these elements, or used after being surface-treated with a hydroxide or the like.

Usable examples of a method for forming the filler layer include a forming method of directly applying a filler-containing slurry to the positive electrode, the negative electrode, or the separator, a method of bonding a sheet made of the filler to the positive electrode, the negative electrode, or the separator, and the like.

(7) A separator which has been used can be used as the separator in the present invention. Specifically, not only a separator composed of polyethylene but also a separator including a polypropylene layer formed on a surface of a polyethylene layer and a polyethylene separator including a resin such as an aramid resin or the like applied to a surface thereof may be used.

EXAMPLES

A positive electrode active material for a nonaqueous electrolyte secondary battery, a positive electrode, and a battery according to the present invention are described below. The positive electrode active material for a nonaqueous electrolyte secondary battery, the positive electrode, and the battery according to the present invention are not limited to those described in examples below, and appropriate modification can be made without changing the gist of the present invention.

First Example

In the first example, the effect by using silicon as a negative electrode active material was examined.

Example 1

[Preparation of Positive Electrode]
(1) Preparation of Positive Electrode Active Material First, 1000 g of particles of lithium cobalt oxide containing 1.0 mol % each of Mg and Al dissolved as solid solution and 0.04 mol % of Zr was prepared, and the particles were added to 3.0 L of pure water and stirred to prepare a suspension in which the lithium cobalt oxide was dispersed. Next, an aqueous solution prepared by dissolving 1 g of sodium fluoride (a ratio of a rare earth element (erbium in Example 1) to fluorine was 1:5.8 in terms of molar ratio) in 100 mL of pure water was added to the suspension. Next, a solution prepared by dissolving 1.81 g (0.068% by mass in terms of erbium element) of erbium nitrate pentahydrate in 200 mL of pure water was added to the suspension. At this time, a 10 mass % aqueous solution of nitric acid or a 10 mass % aqueous solution of sodium hydroxide was appropriately added for adjusting the suspension containing lithium cobalt oxide and sodium fluoride to pH 7.

After the addition of the erbium nitrate pentahydrate solution was completed, the resultant mixture was filtered by suction and the residue was further washed with water. The resultant powder was dried at 120° C. to yield a product in which a compound containing sodium, erbium, and fluorine was adhered to a surface of the lithium cobalt oxide. Then, the resultant powder was heat-treated in air at 300° C. for 5 hours.

Observation of the resultant positive electrode active material with a scanning electron microscope (SEM) confirmed that the compound containing sodium, erbium, and fluorine and having an average particle diameter of 1 nm or more and 100 nm or less is uniformly dispersed and adhered to the surface of the positive electrode active material. In addition, ICP measurement of the amount of the compound adhered showed a value of 0.068% by mass in terms of erbium element relative to the lithium cobalt oxide.

(2) Preparation of Positive Electrode

The powder of the positive electrode active material, a carbon black (acetylene black) powder (average particle diameter: 40 nm) as a positive electrode conductive agent, and polyvinylidene fluoride (PVdF) as a positive electrode binder (binder) were kneaded at a mass ratio of 95:2.5:2.5 in a NMP solution to prepare a positive-electrode mixture slurry. Finally, the positive electrode mixture slurry was coated to both surfaces of a positive-electrode current collector composed of an aluminum foil, dried, and then rolled with a rolling mill to produce a positive electrode including positive electrode mixture layers formed on both surfaces of the positive-electrode current collector. The packing density of the positive electrode was 3.7 g/cc.

[Preparation of Negative Electrode]
(1) Preparation of Silicon Negative Electrode Active Material First, a polycrystalline silicon block was formed by a heat reduction method. Specifically, a silicon core installed in a metal reaction furnace (reduction furnace) was heated to 800° C. by electric heating, and a gas mixture containing a vapor of purified high-purity monosilane ($SiH_4$) gas and purified hydrogen was flowed into the furnace to precipitate polycrystalline silicon on the surface of the silicon core, producing a thick bar-shaped polycrystalline silicon block.

Next, the polycrystalline silicon block was ground and classified to form polycrystalline silicon particles (negative electrode active material particles) with a purity of 99%. The polycrystalline silicon particles had a crystalline size of 32 nm and a median diameter of 10 μm. The crystalline size was calculated according to the Scherrer equation using a half-width of a (111) peak of silicon in powder X-ray diffraction.

The median diameter was defined as a diameter at 50% of accumulated volume in grain size distribution measurement by a laser diffraction method.

(2) Preparation of Negative-Electrode Mixture Slurry

The negative electrode active material powder, a graphite powder serving as a negative electrode conductive agent and having an average particle diameter of 3.5 μm, and a precursor varnish (solvent: NMP, concentration: 47% by mass in terms of polyimide resin after polymerization and imidization by heat treatment) of a thermoplastic polyimide resin serving as a negative electrode binder and having a molecular structure represented by Chem. 1 below (n is an integer of 1 or more), and a glass transition temperature of 300° C. were mixed with NMP used as a dispersion medium so that the mass ratio between the negative electrode active material powder, the negative electrode conductive agent powder, and the polyimide resin after imidization was 89.5:3.7:6.8, preparing a negative-electrode mixture slurry.

The precursor varnish of the polyimide resin can be produced from 3,3',4,4'-benzophenonetetracarboxylic acid diethyl ester represented by Chem. 2, 3, or 4 below, and m-phenylenediamine represented by Chem. 5 below. 3,3',4,4'-benzophenonetetracarboxylic acid diethyl ester represented by Chem. 2, 3, or 4 below can be produced by reacting 2 equivalents of ethanol with 3,3',4,4'-benzophenonetetracarboxylic acid dianhydride represented by Chem. 6 below in the presence of NMP.

[Chem. 1]

[Chem. 2]

wherein R' is an ethyl group.

[Chem. 3]

wherein R' is an ethyl group.

[Chem. 4]

wherein R' is an ethyl group.

[Chem. 5]

[Chem. 6]

(3) Preparation of Negative Electrode

A copper alloy foil having a thickness of 18 μm (C7025 alloy foil having a composition containing 96.2% by mass of Cu, 3% by mass of Ni, 0.65% by mass of Si, and 0.15% by mass of Mg) was used as a negative-electrode current collector, in which the both surfaces were roughened to have a surface roughness Ra (JIS B 0601-1994) of 0.25 μm and a mean peak spacing S (JIS B 0601-1994) of 1.0 μm. The negative-electrode mixture slurry was coated to both surfaces of the negative-electrode current collector in air at 25° C., dried in air at 120° C., and then rolled in air at 25° C. The resultant product was cut into a rectangular shape having a length of 380 mm and a width of 52 mm and then heat-treated in an argon atmosphere at 400° C. for 10 hours to form a negative electrode including negative electrode active material layers formed on the surfaces of the negative-electrode current collector. The negative electrode had a packing density of 1.6 g/cc, and a nickel plate was attached as a negative-electrode current collector tab to an end of the negative electrode.

[Preparation of Nonaqueous Electrolyte]

Lithium hexafluorophosphate ($LiPF_6$) was dissolved at 1.0 mol/l in a solvent prepared by mixing fluoroethylene carbonate (FEC) and methylethyl carbonate (MEC) at a volume ratio of 20:80, and then 0.4% by mass of carbon dioxide gas was dissolved in the resulting solution to prepare a nonaqueous electrolyte.

[Formation of Battery]

A lead terminal was attached to each of the positive and negative electrodes, and the positive and negative electrodes with a separator disposed therebetween were spirally coiled. Then, a core was removed to form a spirally coiled electrode body, and the electrode body was further pressed to form a flat electrode body. Next, the flat electrode body and the nonaqueous electrolyte were disposed in an outer case made of two aluminum laminates in a $CO_2$ atmosphere at 1 atm and 25° C. and then sealed to form a flat nonaqueous electrolyte secondary battery 11 having a structure shown in FIGS. 1 and 2. The secondary battery 11 had a size of thickness 3.6 mm×width 70 mm×height 62 mm, and when the secondary battery was charged to 4.35 V and discharged to 2.75 V, a discharge capacity was 850 mAh.

Figure 1:
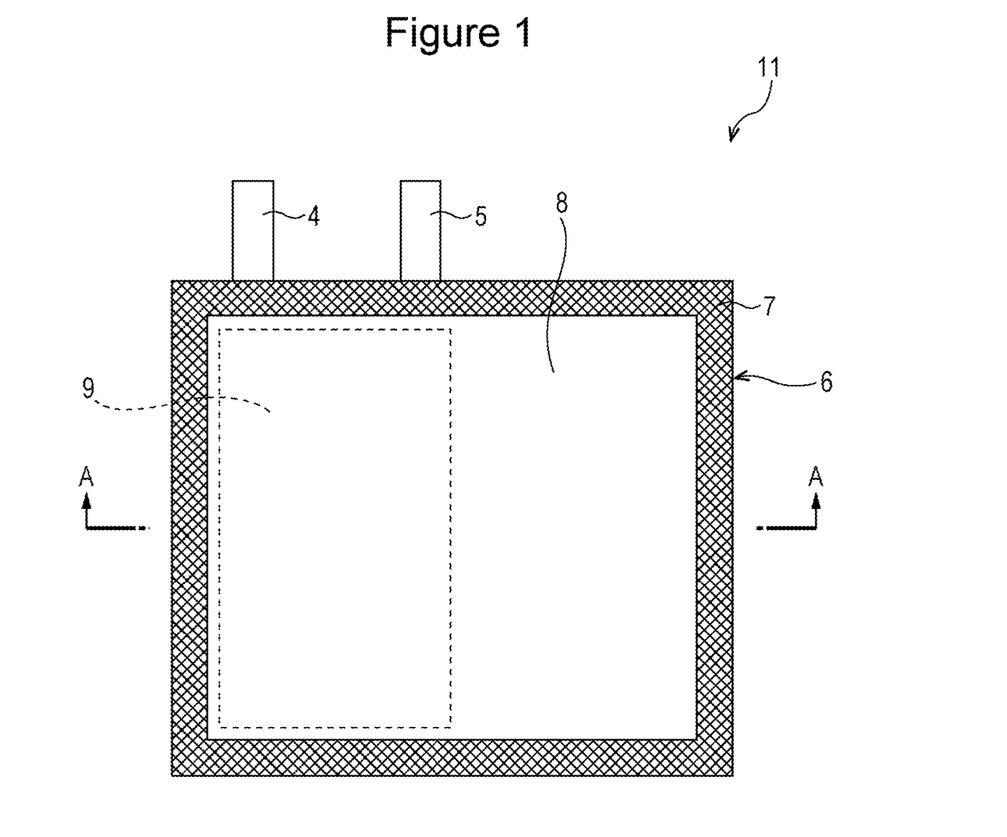
FIG. 1 is a front view of a nonaqueous electrolyte secondary battery according to an embodiment of the present invention.
Figure 2:
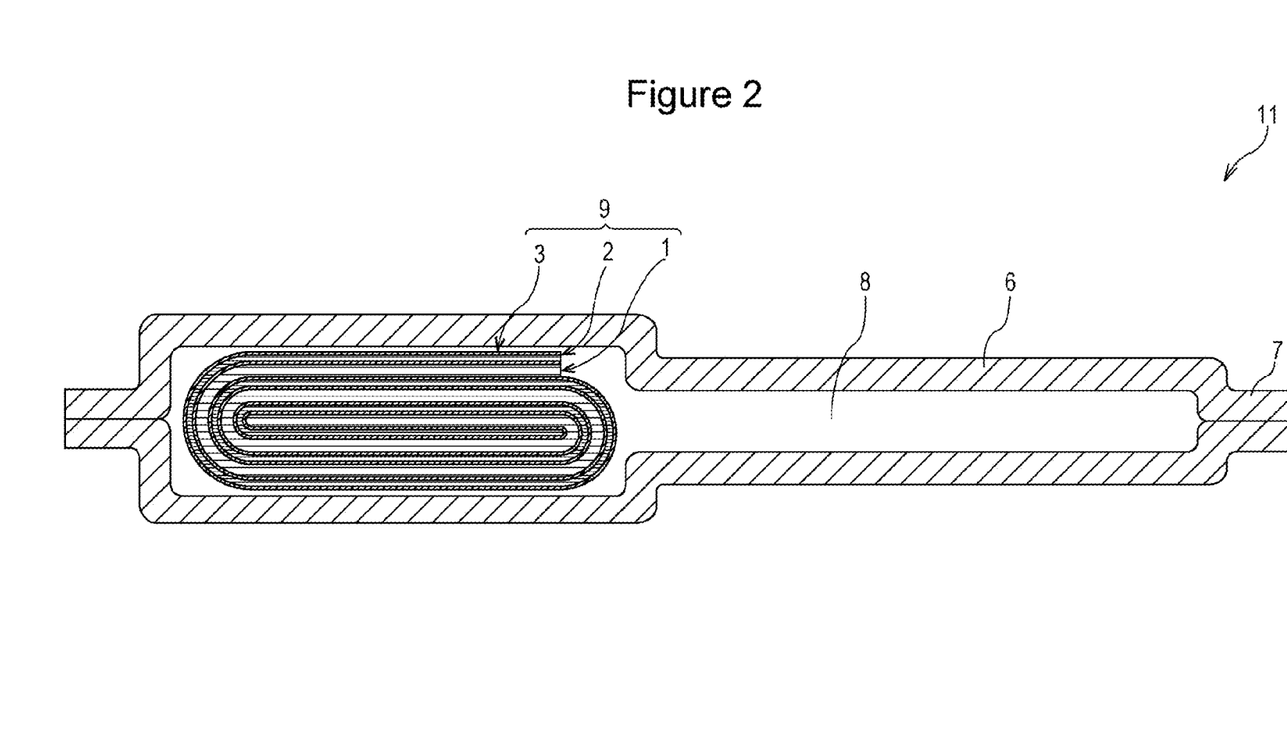
FIG. 2 is a sectional view taken along arrow line A-A in FIG. 1.
Figure 3:
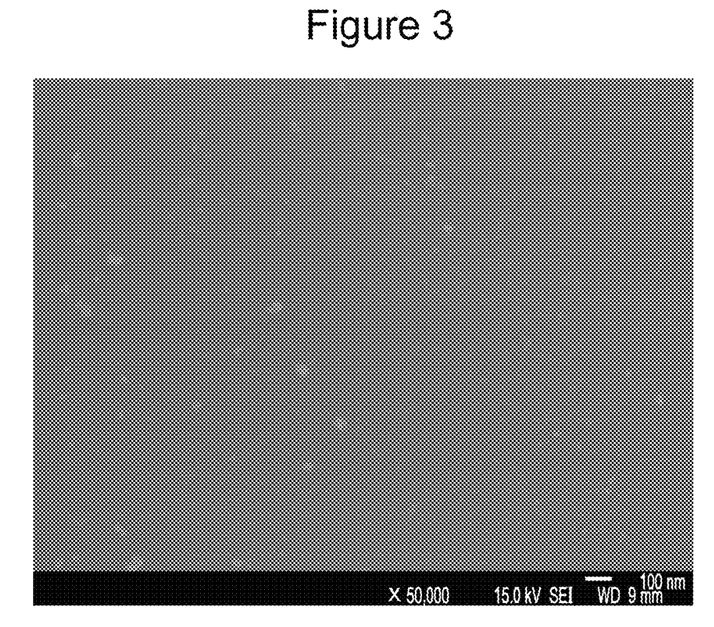
FIG. 3 is a photograph obtained by observing a positive electrode active material of battery A1 with a scanning electron microscope (SEM).

As shown in FIGS. 1 and 2, the nonaqueous electrolyte secondary battery 11 has a specific structure in which a positive electrode 1 and a negative electrode 2 are disposed to face each other with a separator 3 therebetween, and a flat-shape electrode body 9 including the positive and negative electrodes 1 and 2 and the separator 3 is impregnated with the nonaqueous electrolyte. The positive and negative electrodes 1 and 2 are connected to a positive-electrode current collector tab 4 and a negative-electrode current collector tab 5, respectively, thereby forming a structure chargeable and dischargeable as a secondary battery. The electrode body 9 is disposed in a receiving space of an aluminum laminate outer case 6 including an opening 7 with a heat-sealed periphery. In the figures, reference numeral 8 denotes a space chamber for minimizing the influence of gas generated by decomposition of the electrolyte or the like on charge and discharge.

The thus-formed battery is referred to as "battery A1" hereinafter.

Example 2

A battery was formed by the same method as in Example 1 except that in preparing the positive electrode active material, in place of the aqueous solution prepared by dissolving 1 g of sodium fluoride in 100 mL of pure water, an aqueous solution prepared by dissolving 1 g of potassium fluoride (ratio of a rare earth element to fluorine was 1:4.2 in terms of molar ratio) in 100 mL of pure water was used as an aqueous solution to be added to a suspension of lithium cobalt oxide dispersed therein, and heat treatment was performed in air at 120° C. for 5 hours. Observation of the resultant positive electrode active material with a scanning electron microscope (SEM) confirmed that a compound containing potassium, erbium, and fluorine and having an average particle diameter of 1 nm or more and 100 nm or less is uniformly dispersed and adhered to a surface of the positive electrode active material. In addition, ICP measurement of the amount of the compound adhered showed a value of 0.068% by mass in terms of erbium element relative to the lithium cobalt oxide.

The thus-formed battery is referred to as "battery A2" hereinafter.

Comparative Example 1

A battery was formed by the same method as in Example 1 except that in preparing the positive electrode active material, in place of the aqueous solution prepared by dissolving 1 g of sodium fluoride in 100 mL of pure water, an aqueous solution prepared by dissolving 1 g of ammonium fluoride (ratio of a rare earth element to fluorine was 1:6.7 in terms of molar ratio) in 100 mL of pure water was used as an aqueous solution to be added to a suspension of lithium cobalt oxide dispersed therein. Observation of the resultant positive electrode active material with a scanning electron microscope (SEM) confirmed that a compound containing erbium and fluorine and having an average particle diameter of 100 nm or less is uniformly dispersed and adhered to a surface of the positive electrode active material. In addition, ICP measurement of the amount of the compound adhered showed a value of 0.068% by mass in terms of erbium element relative to the lithium cobalt oxide.

The thus-formed battery is referred to as "battery Z1" hereinafter.

Comparative Example 2

A battery was formed by the same method as in Comparative Example 1 except that 0.11 g of lithium fluoride was added to and mixed with a positive electrode active material after the positive electrode active material was prepared and before a positive electrode was formed. ICP measurement of the amount of erbium contained in the mixture showed a value of 0.068% by mass in terms of erbium element relative to lithium cobalt oxide.

The thus-formed battery is referred to as "battery Z2" hereinafter.

Experiment 1

The cycling characteristics of each the batteries A1, A2, Z1, and Z2 were examined by charge and discharge under conditions described below. The results are shown in Table 1.

Charge Condition

The condition was that constant-current charge was performed with a current of 1.0 It (850 mA) until a battery voltage was 4.35 V, and then charge was performed with a constant voltage until a current value was 0.05 It (42.5 mA).

Discharge Condition

The condition was that constant-current discharge was performed with a current of 1.0 It (850 mA) until a battery voltage was 2.75 V.

Resting

A rest interval between the charge test and discharge test was 10 minutes.

The cycling characteristics were evaluated by repeating in order the charge, resting, discharge, and resting to determine a battery lifetime when the discharge capacity in a predetermined cycle was 60% of the discharge capacity in the first cycle.

The temperature of the cycling characteristic test was 25° C.±5° C.

TABLE 1

| Type of battery | Negative electrode active material | Compound on surface of lithium cobalt oxide | | Heat treatment temperature (° C.) | Number of cycles |
|---|---|---|---|---|---|
| | | State | Fluorine compound source | | |
| Battery A1 | Silicon | Adhered | Sodium fluoride | 300 | 520 |
| Battery A2 | | | Potassium fluoride | 120 | 520 |
| Battery Z1 | | | Ammonium fluoride | 300 | 440 |
| Battery Z2 | | Adhered + added | Ammonium fluoride + lithium fluoride (added) | 300 | 440 |

Table 1 indicates that in the batteries A1 and A2 of the present invention in which the compound composed of erbium, fluorine, and an alkali metal is adhered to a surface of the positive electrode active material, the cycling characteristics are significantly improved as compared with the batteries Z1 and Z2 in which the compound composed of only erbium and fluorine is adhered to a surface of lithium cobalt oxide.

Whether the cycling characteristics are good or poor is mainly due to the following two reasons.

(1) The positive electrode deteriorates with side reaction between the positive electrode and the electrolyte and gas is generated due to the side reaction. However, as described above, in order to decrease the influence of the gas generated by the side reaction, the space chamber for storing the gas is provided in each of the batteries A1, A2, Z1, and Z2. Therefore, deterioration of the positive electrode with the side reaction between the positive electrode and the electrolyte can be mainly examined.

(2) In addition to the deterioration of the positive electrode, the deterioration of the positive electrode is increased due to movement of a decomposition product, which is produced by side reaction between the negative electrode and the electrolyte, to the positive electrode. In particular, when silicon is used as the negative electrode active material, the negative electrode active material is cracked with a change in volume during charge-discharge cycles because of a high degree of expansion and contraction with charge and discharge, thereby producing newly formed surfaces electrochemically active (easily producing side reaction with the electrolyte). As a result, side reaction between the electrolyte and the negative electrode active material more significantly occurs. In addition, the decomposition product due to the side reaction is repeatedly moved to the positive electrode and thus reacts with the lithium transition metal composite oxide on the surface of the positive electrode, thereby accelerating the deterioration of the positive electrode.

The cycling deterioration is considered to occur by the above-described two reasons, but the cycling characteristics are improved by adding the compound containing erbium, fluorine, and an alkali metal to the positive electrode (particularly, adhering the compound to the surface of the lithium transition metal composite oxide). Conceivable reasons for this are as follows.

(a) A reason is that as in the batteries A1 and A2, when the amount of fluorine element contained per unit compound is large, particularly, the decomposition product produced on the negative electrode can be suppressed from being moved to the positive electrode and reacting with the lithium transition metal composite oxide.

(b) A reason is that as described in Experiment 2 of a second example described below, when the compound composed of an alkali metal element, fluorine, and a rare earth is adhered to the surface of lithium cobalt oxide, lithium ion conductivity is improved to decrease the interface resistance of the positive electrode as compared with a case where the compound composed of only fluorine and a rare earth is adhered to the surface of the lithium cobalt oxide. As a result, in the batteries A1 and A2, the effect of decreasing impedance on the surface of lithium cobalt oxide is exhibited.

The battery Z2 containing lithium fluoride is less improved in cycling characteristics than in the battery Z1 not containing lithium fluoride. Therefore, even when the fluorine content in the positive electrode is simply increased and the molar ratio between the alkali metal element, rare earth element, and fluorine element is specified to be equivalent to the battery A1, the effect of decreasing electrochemical activity to the side reaction between the positive electrode and the electrolyte is not exhibited. This reveals that as described above in (a) and (b), unless the amount of fluorine element contained per unit compound is increased or the compound composed of an alkali metal element, fluorine, and rare earth is adhered to the surface of the lithium transition metal composite oxide, the effect of improving cycling characteristics is not exhibited.

Experiment 2

An aqueous erbium nitrate solution was added to an aqueous sodium fluoride solution under stirring. In this case, the ratio of erbium to fluorine was 1:5.8 in terms of molar ratio, and in order to adjust the resultant mixed solution to pH 7, a 10 mass % aqueous nitric acid solution or a 10 mass % aqueous sodium hydroxide solution was appropriately added to the mixed solution. The resulting precipitates were filtered off by suction, further washed with water, and then dried at 120° C. to produce a powder. As a result of X-ray diffraction analysis of the resulting powder, it was found that the powder is $NaErF_4$. Similarly, when the resultant powder was heat-treated in air at 300° C. for 5 hours, the powder was found to be $NaErF_4$.

Second Example

In second to seventh examples, it was examined whether or not the same effect was achieved even by using a carbon material (graphite) as the negative electrode active material. In the third example to seventh example, it was also examined whether or not the same effect was achieved even by using a rare earth element, other than erbium, to be contained in the compound adhered to the surface of the positive electrode active material.

Example

This example was the same as Example 1 of the above-described first example except that formation of a negative electrode, preparation of a nonaqueous electrolyte, and formation of a battery were conduced as described below. That is, the configuration of the positive electrode was completely the same as in Example 1 of the above-described first example.

The thus-formed battery is referred to as "battery B" hereinafter.

[Preparation of Negative Electrode]

Graphite used as a negative electrode active material, SBR (styrene-butadiene rubber) used as a binder, and CMC (carboxymethyl cellulose) used as a thickener were weighed at a mass ratio of 98:1:1, and then kneaded in an aqueous solution to prepare a negative electrode active material slurry. The negative electrode active material slurry was coated in a predetermine amount to both surfaces of a copper foil used as a negative-electrode current collector, further dried, and then rolled so that the packing density was 1.6 g/cc to form a genitive electrode.

[Preparation of Nonaqueous Electrolyte]

Lithium hexafluorophosphate ($LiPF_6$) was dissolved at 1.0 mol/l in a solvent prepared by mixing ethylene carbonate (EC) and methylethyl carbonate (MEC) at a volume ratio of 20:80 to prepare a nonaqueous electrolyte.

[Formation Of Battery]

A lead terminal was attached to each of the positive and negative electrodes, and the positive and negative electrodes with a separator disposed therebetween were spirally coiled. Then, a core was removed to form a spirally coiled electrode body, and the electrode body was further pressed to form a flat electrode body. Next, the flat electrode body and the nonaqueous electrolyte were disposed in an outer case made of two aluminum laminates in an argon atmosphere at 1 atm and 25° C. and then sealed to form a flat nonaqueous electrolyte secondary battery 11 having a structure shown in FIGS. 1 and 2. The secondary battery 11 had a size of thickness 3.6 mm×width 70 mm×height 62 mm, and when the secondary battery was charged to 4.40 V and discharged to 2.75 V, a discharge capacity was 750 mAh.

Comparative Example

A battery was formed by the same method as in the example of the second example except that in preparing the positive electrode active material, in place of the aqueous solution prepared by dissolving 1 g of sodium fluoride in 100 mL of pure water, an aqueous solution prepared by dissolving 1 g of ammonium fluoride (ratio of a rare earth element to fluorine was 1:6.7 in terms of molar ratio) in 100 mL of pure water was used as an aqueous solution to be added to a suspension containing lithium cobalt oxide dispersed therein. Observation of the resultant positive electrode active material with a scanning electron microscope (SEM) confirmed that a compound containing erbium and fluorine and having an average particle diameter of 100 nm or less is uniformly dispersed and adhered to a surface of the positive electrode active material. In addition, ICP measurement of the amount of the compound adhered showed a value of 0.068% by mass in terms of erbium element relative to the lithium cobalt oxide.

The thus-formed battery is referred to as "battery Y" hereinafter.

Experiment 1

The cycling characteristics and initial charge-discharge efficiencies of the batteries B and Y were examined. The results are shown in Table 2.

The charge-discharge conditions for examining the cycling characteristics were the same as in the experiment in the first example except that 1.0 It was 750 mA, and the charge final voltage was 4.4 V. The cycling characteristics were evaluated by determining a battery lifetime when the discharge capacity in a predetermine cycle was 85% of the discharge capacity in the first cycle. A value of the battery B was indicated by an index relative to 100 of the number of cycles of the battery Y.

On the other hand, the initial charge-discharge efficiency was determined using equation (1) described below from the charge capacity in the first cycle and the discharge capacity in the first cycle measured in the first charge-discharge in examination of the cycling characteristics.

Initial charge-discharge efficiency (%)=(discharge capacity in first cycle/charge capacity in first cycle)×100 (1)

element), fluorine, and erbium (rare earth element) is present on the surface of lithium cobalt oxide is improved in the initial charge-discharge efficiency and cycling characteristics as compared with the battery Y in which the compound composed of only fluorine and erbium is present on the surface of lithium cobalt oxide.

As is clear from experiment 8 described below, in comparison with silicon, graphite less produces decomposition reaction of the electrolyte on the surface of the negative electrode active material. Therefore, the differences in the initial charge-discharge efficiency and cycling characteristics are considered to be mainly due to the ease of occurrence of decomposition reaction of the electrolyte on the surface of the positive electrode active material.

Experiment 2

The alternating-current impedance characteristics of the batteries B and Y were examined by a method described below. The results are shown in FIG. 4.

[Test Method for Alternating-Current Impedance Characteristics]

At room temperature, each of the batteries was charged with a constant current of 750 mA (1.0 It) until the voltage reached 4.4 V and further charged with a constant voltage of 4.4 V until the current value become 37.5 mA (0.05 It), and then alternating-current impedance was measured (Cole-Cole plot) within a range of 10 kHz to 50 mHz at an alternating-current applied voltage with an amplitude of 10 mV.

Figure 4:
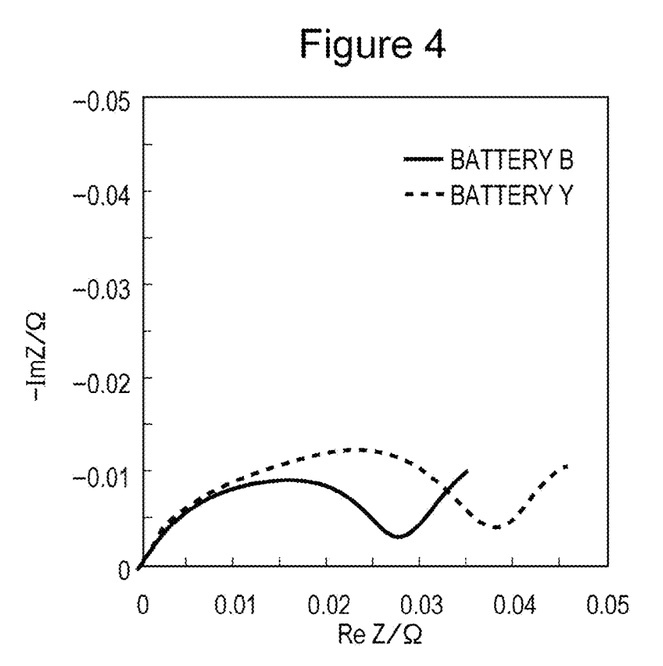
FIG. 4 is a graph showing alternating-current impedance characteristics of batteries B and Y.

FIG. 4 reveals that the battery B in which the compound composed of an alkali metal element, fluorine, and a rare earth element is adhered to the surface of lithium cobalt oxide shows the results with a smaller circular arc in alternating-current impedance measurement as compared with the battery Y in which the compound composed of only fluorine and a rare earth element is adhered to the surface of lithium cobalt oxide. It is thus found that the impedance of the battery B is decreased as compared with the battery Y. This impedance decreasing effect is considered to be due to the reason that since the positive electrode active material in the battery B contains an alkali metal in the compound adhered to the surface of lithium cobalt oxide, conductivity of lithium ions on the surface of lithium cobalt oxide is improved, thereby decreasing the interface resistance. Thus, it is considered that as described above, the initial charge-discharge efficiency and cycling characteristics are improved due to the decrease in interface resistance.

Third Example

Example

A battery was formed by the same method as in the example of the above-described second example except that

TABLE 2

| Type of battery | Negative electrode active material | Rare earth element | Fluorine compound source | Initial charge-discharge efficiency (%) | Cycling characteristics |
|---|---|---|---|---|---|
| Battery B | Graphite | Erbium | Sodium fluoride | 90.2 | 195 |
| Battery Y | | | Ammonium fluoride | 89.2 | 100 |

Table 2 indicates that even when graphite (carbon material) is used as the negative electrode active material, the battery B in which the compound composed of sodium (alkali metal in preparing the positive electrode active material, 1.56 g of yttrium nitrate hexahydrate was used in place of 1.81 g of erbium nitrate pentahydrate. Observation of the resultant positive electrode active material with a scanning electron microscope (SEM) confirmed that a compound containing sodium, yttrium, and fluorine is uniformly dispersed and adhered to a surface of lithium cobalt oxide, and the compound has an average particle diameter of 1 nm or more and 100 nm or less. In addition, ICP measurement of the amount of the compound adhered showed a value of 0.036% by mass in terms of yttrium element relative to the lithium cobalt oxide.

The thus-formed battery is referred to as "battery C" hereinafter.

Comparative Example

A battery was formed by the same method as in the comparative example of the above-described second example except that in preparing the positive electrode active material, 1.56 g of yttrium nitrate hexahydrate was used in place of 1.81 g of erbium nitrate pentahydrate. Observation of the resultant positive electrode active material with a scanning electron microscope (SEM) confirmed that a compound containing yttrium and fluorine is uniformly dispersed and adhered to a surface of lithium cobalt oxide, and the compound has an average particle diameter of 100 nm or less. In addition, ICP measurement of the amount of the compound adhered showed a value of 0.036% by mass in terms of yttrium element relative to the lithium cobalt oxide.

The thus-formed battery is referred to as "battery X" hereinafter.

Experiment

The cycling characteristics and initial charge-discharge efficiencies of the batteries C and X were examined. The results are shown in Table 3. The experiment conditions were the same as those described in Experiment 1 of the second example. A value of the cycling characteristics of the battery C was indicated by an index relative to 100 of the number of cycles of the battery X.

TABLE 3

| Type of battery | Negative electrode active material | Rare earth element | Fluorine compound source | Initial charge-discharge efficiency (%) | Cycling characteristics |
|---|---|---|---|---|---|
| Battery C | Graphite | Yttrium | Sodium fluoride | 90.0 | 180 |
| Battery X | | | Ammonium fluoride | 88.5 | 100 |

Table 3 indicates that even when graphite is used as the negative electrode active material, the battery C in which the compound composed of sodium, fluorine, and yttrium is present on the surface of lithium cobalt oxide is improved in the initial charge-discharge efficiency and cycling characteristics as compared with the battery X in which the compound composed of only fluorine and yttrium is adhered to the surface of lithium cobalt oxide.

The differences in the cycling characteristics in this experiment are considered to be due to the same reason as that described in Experiment 1 of the second example.

Fourth Example

Example

A battery was formed by the same method as in the example of the above-described second example except that in preparing the positive electrode active material, 1.77 g of lanthanum nitrate hexahydrate was used in place of 1.81 g of erbium nitrate pentahydrate. Observation of the resultant positive electrode active material with a scanning electron microscope (SEM) confirmed that a compound containing sodium, lanthanum, and fluorine is uniformly dispersed and adhered to a surface of lithium cobalt oxide, and the compound has an average particle diameter of 1 nm or more and 100 nm or less. In addition, ICP measurement of the amount of the compound adhered showed a value of 0.057% by mass in terms of lanthanum element relative to the lithium cobalt oxide.

The thus-formed battery is referred to as "battery D" hereinafter.

Comparative Example

A battery was formed by the same method as in the comparative example of the above-described second example except that in preparing the positive electrode active material, 1.77 g of lanthanum nitrate hexahydrate was used in place of 1.81 g of erbium nitrate pentahydrate. Observation of the resultant positive electrode active material with a scanning electron microscope (SEM) confirmed that a compound containing lanthanum and fluorine is uniformly dispersed and adhered to a surface of lithium cobalt oxide, and the compound has an average particle diameter of 100 nm or less. In addition, ICP measurement of the amount of the compound adhered showed a value of 0.057% by mass in terms of lanthanum element relative to the lithium cobalt oxide.

The thus-formed battery is referred to as "battery W" hereinafter.

Experiment

The cycling characteristics and initial charge-discharge efficiencies of the batteries D and W were examined. The results are shown in Table 4. The experiment conditions were the same as those described in Experiment 1 of the second example. A value of the cycling characteristics of the battery D was indicated by an index relative to 100 of the number of cycles of the battery W.

TABLE 4

| Type of battery | Negative electrode active material | Rare earth element | Fluorine compound source | Initial charge-discharge efficiency (%) | Cycling characteristics |
|---|---|---|---|---|---|
| Battery D | Graphite | Lanthanum | Sodium fluoride | 90.0 | 141 |
| Battery W | | | Ammonium fluoride | 88.7 | 100 |

Table 4 indicates that even when graphite is used as the negative electrode active material, the battery D in which the compound composed of sodium, fluorine, and lanthanum is present on the surface of lithium cobalt oxide is improved in the initial charge-discharge efficiency and cycling characteristics as compared with the battery W in which the compound composed of only fluorine and lanthanum is adhered to the surface of lithium cobalt oxide.

The differences in the cycling characteristics in this experiment are considered to be due to the same reason as that described in Experiment 1 of the second example.

Fifth Example

Example

A battery was formed by the same method as in the example of the above-described second example except that in preparing the positive electrode active material, 1.79 g of neodymium nitrate hexahydrate was used in place of 1.81 g of erbium nitrate pentahydrate. Observation of the resultant positive electrode active material with a scanning electron microscope (SEM) confirmed that a compound containing sodium, neodymium, and fluorine is uniformly dispersed and adhered to a surface of lithium cobalt oxide, and the compound has an average particle diameter of 1 nm or more and 100 nm or less. In addition, ICP measurement of the amount of the compound adhered showed a value of 0.059% by mass in terms of neodymium element relative to the lithium cobalt oxide.

The thus-formed battery is referred to as "battery E" hereinafter.

Comparative Example

A battery was formed by the same method as in the comparative example of the above-described second example except that in preparing the positive electrode active material, 1.79 g of neodymium nitrate hexahydrate was used in place of 1.81 g of erbium nitrate pentahydrate. Observation of the resultant positive electrode active material with a scanning electron microscope (SEM) confirmed that a compound containing neodymium and fluorine is uniformly dispersed and adhered to a surface of lithium cobalt oxide, and the compound has an average particle diameter of 100 nm or less. In addition, ICP measurement of the amount of the compound adhered showed a value of 0.059% by mass in terms of neodymium element relative to the lithium cobalt oxide.

The thus-formed battery is referred to as "battery V" hereinafter.

Experiment

The cycling characteristics and initial charge-discharge efficiencies of the batteries E and V were examined. The results are shown in Table 5. The experiment conditions were the same as those described in Experiment 1 of the second example. A value of the cycling characteristics of the battery E was indicated by an index relative to 100 of the number of cycles of the battery V.

TABLE 5

| Type of battery | Negative electrode active material | Rare earth element | Fluorine compound source | Initial charge-discharge efficiency (%) | Cycling characteristics |
|---|---|---|---|---|---|
| Battery E | Graphite | Neodymium | Sodium fluoride | 90.1 | 174 |
| Battery V | | | Ammonium fluoride | 88.9 | 100 |

Table 5 indicates that even when graphite is used as the negative electrode active material, the battery E in which the compound composed of sodium, fluorine, and neodymium is present on the surface of lithium cobalt oxide is improved in the initial charge-discharge efficiency and cycling characteristics as compared with the battery V in which the compound composed of only fluorine and neodymium is adhered to the surface of lithium cobalt oxide.

The differences in the cycling characteristics in this experiment are considered to be due to the same reason as that described in Experiment 1 of the second example.

Sixth Example

Example

A battery was formed by the same method as in the example of the above-described second example except that in preparing the positive electrode active material, 1.82 g of samarium nitrate hexahydrate was used in place of 1.81 g of erbium nitrate pentahydrate. Observation of the resultant positive electrode active material with a scanning electron microscope (SEM) confirmed that a compound containing sodium, samarium, and fluorine is uniformly dispersed and adhered to a surface of lithium cobalt oxide, and the compound has an average particle diameter of 1 nm or more and 100 nm or less. In addition, ICP measurement of the amount of the compound adhered showed a value of 0.061% by mass in terms of samarium element relative to the lithium cobalt oxide.

The thus-formed battery is referred to as "battery F" hereinafter.

Comparative Example

A battery was formed by the same method as in the comparative example of the above-described second example except that in preparing the positive electrode active material, 1.82 g of samarium nitrate hexahydrate was used in place of 1.81 g of erbium nitrate pentahydrate. Observation of the resultant positive electrode active material with a scanning electron microscope (SEM) confirmed that a compound containing samarium and fluorine is uniformly dispersed and adhered to a surface of lithium cobalt oxide, and the compound has an average particle diameter of 100 nm or less. In addition, ICP measurement of the amount of the compound adhered showed a value of 0.061% by mass in terms of samarium element relative to the lithium cobalt oxide.

The thus-formed battery is referred to as "battery U" hereinafter.

Experiment

The cycling characteristics and initial charge-discharge efficiencies of the batteries F and U were examined. The results are shown in Table 6. The experiment conditions were the same as those described in Experiment 1 of the second example. A value of the cycling characteristics of the battery F was indicated by an index relative to 100 of the number of cycles of the battery U.

TABLE 6

| Type of battery | Negative electrode active material | Rare earth element | Fluorine compound source | Initial charge-discharge efficiency (%) | Cycling characteristics |
|---|---|---|---|---|---|
| Battery F | Graphite | Samarium | Sodium fluoride | 90.1 | 191 |
| Battery U | | | Ammonium fluoride | 88.6 | 100 |

Table 6 indicates that even when graphite is used as the negative electrode active material, the battery F in which the compound composed of sodium, fluorine, and samarium is present on the surface of lithium cobalt oxide is improved in the initial charge-discharge efficiency and cycling characteristics as compared with the battery U in which the compound composed of only fluorine and samarium is adhered to the surface of lithium cobalt oxide.

The differences in the cycling characteristics in this experiment are considered to be due to the same reason as that described in Experiment 1 of the second example.

Seventh Example

Example

A battery was formed by the same method as in the example of the above-described second example except that in preparing the positive electrode active material, 1.69 g of ytterbium nitrate trihydrate was used in place of 1.81 g of erbium nitrate pentahydrate. Observation of the resultant positive electrode active material with a scanning electron microscope (SEM) confirmed that a compound containing sodium, ytterbium, and fluorine is uniformly dispersed and adhered to a surface of lithium cobalt oxide, and the compound has an average particle diameter of 1 nm or more and 100 nm or less. In addition, ICP measurement of the amount of the compound adhered showed a value of 0.071% by mass in terms of ytterbium element relative to the lithium cobalt oxide.

The thus-formed battery is referred to as "battery G" hereinafter.

Comparative Example

A battery was formed by the same method as in the comparative example of the above-described second example except that in preparing the positive electrode active material, 1.69 g of ytterbium nitrate trihydrate was used in place of 1.81 g of erbium nitrate pentahydrate. Observation of the resultant positive electrode active material with a scanning electron microscope (SEM) confirmed that a compound containing ytterbium and fluorine is uniformly dispersed and adhered to a surface of lithium cobalt oxide, and the compound has an average particle diameter of 100 nm or less. In addition, ICP measurement of the amount of the compound adhered showed a value of 0.071% by mass in terms of ytterbium element relative to the lithium cobalt oxide.

The thus-formed battery is referred to as "battery T" hereinafter.

Experiment

The cycling characteristics and initial charge-discharge efficiencies of the batteries G and T were examined. The results are shown in Table 7. The experiment conditions were the same as those described in Experiment 1 of the second example. A value of the cycling characteristics of the battery G was indicated by an index relative to 100 of the number of cycles of the battery T.

TABLE 7

| Type of battery | Negative electrode active material | Rare earth element | Fluorine compound source | Initial charge-discharge efficiency (%) | Cycling characteristics |
|---|---|---|---|---|---|
| Battery G | Graphite | Ytterbium | Sodium fluoride | 90.2 | 191 |
| Battery T | | | Ammonium fluoride | 88.2 | 100 |

Table 7 indicates that even when graphite is used as the negative electrode active material, the battery G in which the compound composed of sodium, fluorine, and ytterbium is present on the surface of lithium cobalt oxide is improved in the initial charge-discharge efficiency and cycling characteristics as compared with the battery T in which the compound composed of only fluorine and ytterbium is adhered to the surface of lithium cobalt oxide.

The differences in the cycling characteristics in this experiment are considered to be due to the same reason as that described in Experiment 1 of the second example.

Summary of Second Example to Seventh Example

Tables 2 to 7 reveal that when the compound composed of a rare earth element, an alkali metal element, and a fluorine element is adhered to the surface of lithium cobalt oxide, the initial charge-discharge efficiency and cycling characteristics are improved as compared with the compound composed of only a rare earth element and a fluorine element. The same effect can be observed by using yttrium, lanthanum, neodymium, samarium, and ytterbium as well as erbium as the rare earth element in the compound, and thus the effect is considered to be exhibited even by using a rare earth element other than the rare earth elements used in the experiments.

Eighth Example

In the eighth example, differences in effect with different types of negative electrode active materials were examined.

Example 1

A battery was formed by the same method as in Example 1 of the first example except that when the battery was charged to 4.35 V and discharged to 2.75 V, the discharge capacity of the battery was 800 mAh.

The thus-formed battery is referred to as "battery H1" hereinafter.

Comparative Example 1

A battery was formed by the same method as in Example 1 of the eighth example except that a positive electrode active material not containing an erbium compound adhered to lithium cobalt oxide (that is, the positive electrode composed of only lithium cobalt oxide) and not subjected to heat treatment was used.

The thus-formed battery is referred to as "battery S1" hereinafter.

Example 2

A battery was formed by the same method as in the example of the second example except that when the battery was charged to 4.40 V and discharged to 2.75V, the discharge capacity of the battery was 800 mAh, and an electrolyte described below was used. The electrolyte used was prepared by dissolving lithium hexafluorophosphate ($LiPF_6$) at 1 mol/litter in a solvent prepared by mixing fluoroethylene carbonate (FEC) and methylethyl carbonate (MEC) at a volume ratio of 20:80, and then dissolving 0.4 mass % of carbon dioxide gas in the resultant solution.

The thus-formed battery is referred to as "battery H2" hereinafter.

Comparative Example 2

A battery was formed by the same method as in Example 2 of the eighth example except that a positive electrode active material not containing an erbium compound adhered to lithium cobalt oxide (that is, the positive electrode composed of only lithium cobalt oxide) and not subjected to heat treatment was used.

The thus-formed battery is referred to as "battery S2" hereinafter.

Experiment

The cycling characteristics (capacity of each of the batteries after the passage of 200 cycles) of the batteries H1, H2, S1, and S2 were examined. The results are shown in Table 8. The charge-discharge conditions for examining the cycling characteristics were the same as in Experiment 1 of the first example except that 1.0 It was 800 mA, and the charge final voltage for the batteries H2 and S2 was 4.40 V. A value of the battery H1 was indicated by an index relative to 100 of the capacity of the battery S1 after 200 cycles, and a value of the battery H2 was indicated by an index relative to 100 of the capacity of the battery S2 after 200 cycles.

TABLE 8

| Type of battery | Negative electrode active material | Rare earth element contained in compound on surface of lithium cobalt oxide | Cycling characteristics |
| --- | --- | --- | --- |
| Battery H1 | Silicon | Erbium | 320 |
| Battery S1 | — | — | 100 |
| Battery H2 | Carbon | Erbium | 110 |
| Battery S2 | — | — | 100 |

Table 8 indicates that when graphite (carbon material) or silicon is used as the negative electrode active material, the cycling characteristics are improved by adhering the compound composed of an alkali metal such as sodium, a rare earth element such as erbium, and a fluorine element to the surface of lithium cobalt oxide. In particular, it is found that when silicon is used as the negative electrode active material, the effect of improving cycling characteristics is very large.

This is because, as described above, silicon easily produces newly formed surfaces by a phenomenon such as breakage due to a large change by expansion and contraction during charge-discharge cycles. Therefore, decomposition reaction of the electrolyte easily occurs on the surface of the negative electrode active material, and thus the amount of the decomposition product produced by the reaction and moved to the positive electrode is significantly increased. Therefore, unless the compound composed of an alkali metal, a rare earth element, and a fluorine element is adhered to the surface of lithium cobalt oxide, the positive electrode greatly deteriorates. In contrast, when graphite is used as the negative electrode active material, decomposition reaction of the electrolyte less occurs on the surface of the negative electrode active material as compared with the use of silicon as the negative electrode material, and thus the amount of the decomposition product moved to the positive electrode is not so large. Therefore, even when the compound composed of an alkali metal, a rare earth element, and a fluorine element is not adhered to the surface of lithium cobalt oxide, deterioration in the positive electrode is not so large.

INDUSTRIAL APPLICABILITY

The present invention can be expected for development of driving power supplies for mobile information terminals, for example, cellular phones, notebook-size personal computers, PDAs, and the like, and driving power supplies for high output, for example, HEVs and electric tools.

REFERENCE SIGNS LIST

1: positive electrode
2: negative electrode
3: separator
4: positive-electrode current collector tab
5: negative-electrode current collector tab
6: aluminum laminate outer case
8: space chamber
11: nonaqueous electrode secondary battery oxide

The invention claimed is:
1. A positive electrode active material for a nonaqueous electrolyte secondary battery, the positive electrode active material comprising a lithium transition metal composite oxide and a compound composed of an alkali metal element, a fluorine element, and a rare earth element, wherein the compound is mainly present on a surface of the lithium transition metal composite oxide, and wherein the compound composed of an alkali metal element, a fluorine element, and a rare earth element has an average particle diameter of 1 nm or more and 100 nm or less.

2. The positive electrode active material for a nonaqueous secondary battery according to claim 1, wherein the compound composed of an alkali metal element, a fluorine element, and a rare earth element is adhered to the surface of the lithium transition metal composite oxide.

3. The positive electrode active material for a nonaqueous secondary battery according to claim 1, wherein the rare earth element is at least one selected from erbium, yttrium, lanthanum, neodymium, samarium, and ytterbium.

4. The positive electrode active material for a nonaqueous secondary battery according to claim 2, wherein the rare earth element is at least one selected from erbium, yttrium, lanthanum, neodymium, samarium, and ytterbium.

5. A positive electrode for a nonaqueous electrolyte secondary battery comprising:
    a positive electrode current collector; and
    a positive electrode mixture layer formed on at least one surface of the positive electrode current collector,
    wherein the positive electrode mixture layer contains the positive electrode active material according to claim 1.

6. A nonaqueous electrolyte secondary battery comprising the positive electrode according to claim 5, a negative electrode, and a nonaqueous electrolyte, wherein a negative electrode active material contained in the negative electrode contains at least one selected from the group consisting of carbon particles, silicon particles, and silicon alloy particles.

7. The positive electrode active material for a nonaqueous secondary battery according to claim 1, wherin the alkali metal element is at least one selected from sodium and potassium.

8. A positive electrode active material for a nonaqueous electrolyte secondary battery, the positive electrode active material comprising a lithium transition metal composite oxide and a compound composed of an alkali metal element, a fluorine element, and a rare earth element, wherein the compound is present on a surface of the lithium transition metal composite oxide, and
    wherein the compound composed of an alkali metal element, a fluorine element, and a rare earth element has an average particle diameter of 1 nm or more and 100 nm or less.

9. The positive electrode active material for a nonaqueous secondary battery according to claim 8, wherein the compound composed of an alkali metal element, a fluorine element, and a rare earth element is adhered to the surface of the lithium transition metal composite oxide.

10. The positive electrode active material for a nonaqueous secondary battery according to claim 8, wherein the rare earth element is at least one selected from erbium, yttrium, lanthanum, neodymium, samarium, and ytterbium.

11. The positive electrode active material for a nonaqueous secondary battery according to claim 9, wherein the rare earth element is at least one selected from erbium, yttrium, lanthanum, neodymium, samarium, and ytterbium.

12. A positive electrode for a nonaqueous electrolyte secondary battery comprising:
    a positive electrode current collector; and
    a positive electrode mixture layer formed on at least one surface of the positive electrode current collector,
    wherein the positive electrode mixture layer contains the positive electrode active material according to claim 8.

13. A nonaqueous electrolyte secondary battery comprising the positive electrode according to claim 12, a negative electrode, and a nonaqueous electrolyte, wherein a negative electrode active material contained in the negative electrode contains at least one selected from the group consisting of carbon particles, silicon particles, and silicon alloy particles.

14. The positive electrode active material for a nonaqueous secondary battery according to claim 8, wherein the alkali metal element is at least one selected from sodium and potassium.

15. A positive electrode active matrial for a nonaqueous electrolyte secondary battery, the positive electrode active material comprising a lithium transition metal composite oxide and a compound composed of an alkali metal element, fluorine element, and a rare earth element of at least one selected from erbium, lanthanum, neodymium, samarium, and ytterbium.

16. The positive electrode active material for a nonaqueous secondary battery according to claim 15, wherein the compound composed of an alkali metal element, a fluorine element, and a rare earth element is adhered to the surface of the lithium transition metal composite oxide.

17. The positive electrode active material for a nonaqueous secondary battery according to claim 15, wherein the compound composed of an alkali metal element, a fluorine element, and a rare earth element has an average particle diameter of 1 nm or more and 100 nm or less.

18. A positive electrode for a nonaqueous electrolyte secondary battery comprising:
    a positive electrode current collector; and
    a positive electrode mixture layer formed on at least one surface of the positive electrode current collector,
    wherein the positive electrode mixture layer contains the positive electrode active material according to claim 15.

19. A nonaqueous electrolyte secondary battery comprising the positive electrode according to claim 18, a negative electrode, and a nonaqueous electrolyte, wherein a negative electrode active material contained in the negative electrode contains at least one selected from the group consisting of carbon particles, silicon particles, and silicon alloy particles.

20. The positive electrode active material for a nonaqueous secondary battery according to claim 15, wherein the alkali metal element is at least one selected from sodium and potassium.

* * * * *